United States Patent [19]
Gonzalez

[11] Patent Number: 4,965,138
[45] Date of Patent: Oct. 23, 1990

[54] STRUCTURAL PANEL

[76] Inventor: René Gonzalez, 28294 Pierce St., Southfield, Mich. 48076

[21] Appl. No.: 409,910

[22] Filed: Sep. 20, 1989

[51] Int. Cl.$^5$ ............................ F41H 5/06; F41H 7/04
[52] U.S. Cl. .................................... 428/593; 428/598; 428/604; 89/36.02; 89/36.08
[58] Field of Search ....................... 428/593, 604, 598; 52/794, 799, 806; 89/36.02, 36.08

[56] References Cited

U.S. PATENT DOCUMENTS

| | | | |
|---|---|---|---|
| 2,481,046 | 9/1949 | Scurlock | 428/593 |
| 3,067,494 | 12/1962 | Spain et al. | 428/604 |
| 3,217,845 | 11/1965 | Reynolds et al. | 428/604 |
| 3,507,634 | 4/1970 | O'Driscoll | 428/604 |
| 3,884,646 | 5/1975 | Konnoy | 428/593 |
| 4,292,375 | 9/1981 | Ko | 428/604 |
| 4,397,902 | 8/1983 | Resch | 52/794 |
| 4,559,274 | 12/1985 | Kloppe | 428/626 |

FOREIGN PATENT DOCUMENTS

1124180 10/1956 France ................................. 52/794
1317074 6/1987 U.S.S.R. ................................ 52/806

Primary Examiner—John J. Zimmerman
Attorney, Agent, or Firm—David L. Kuhn; Peter A. Taucher

[57] ABSTRACT

Disclosed herein is a cast or molded structural panel having two plates or sheets integrally joined to an intermediate zone. The intermediate zone is formed either of a cross corrugated panel or a double tray structure between the plates. The cross corrugated panel may be regarded as having a first set of corrugations perpendicularly intersecting a second set of corrugations. The double tray structure may be described as two arrays of hollow pyramids whose bases are joined to one of the sheets. One array of pyramids fits in an interdigitally complementary fashion into the other array of pyramids, and the two trays are integrally joined at the areas of contract between pyramids. Filler material may occupy the cavities defined by the intermediate zone and the plates. In the case of an apertured intermediate zone, the fillter will form a continuous lattice-like structure interwoven with this zone.

18 Claims, 6 Drawing Sheets

STRUCTURAL PANEL

GOVERNMENT INTEREST

The invention described herein may be manufactured, used, and licensed by or for the Government for governmental purposes without payment to me of any royalty thereon.

BACKGROUND AND SUMMARY

The invention concerns structural panels and specifically relates to structural panels usable to construct vehicle bodies having no frames.

Many well known configurations are used for structural panels, one of the most common being a composite panel comprised of layers of different materials bonded together, such as wood sandwiched between sheets of metal to form doors of semi-trailers. Another common construction is a corrugated sheet bonded between two flat sheets in much the same way as cardboard for boxes. Still other configurations are known as "honeycomb" constructions due to their structural similarity to a bee's wax honeycomb. The honeycomb constructions for panels generally have adjoining tube-like cells with central axes normal to the general plane of the panel, the ends of the cells being bonded to opposed inner faces of the panel. It is also common for structural panels to be comprised of two or more layers of the same material bonded together, each layer having a different grain or fiber orientation, as, for example in plywood panels. Frequently, multiple corrugated sheets are bonded together with the corrugations of one or more sheets being normal to the corrugations in adjacent sheets.

Various problems have occurred with these well known constructions for panels. For example, composite panels tend to delaminate when they are bent, impacted or fatigued, the delamination being largely due to stress concentrations at bonding points. Such delamination is a limiting factor when using composite panels for supporting loads. Another, related problem with some known structural panels is inflexibility at bonding points between the outer sheets and the inner body of the panels, these panels often failing at the bonding points.

My invention overcomes the above problems by providing a structural panel that is formed of a single, unitary piece and not of several pieces fixed together by such means as adhesives, welding or rivets. My invention is a panel having two outer sheets and having at least one inner tray comprised of hollow apertured pyramids, the sheets and trays being cast together to form a single, continuous unit. The integration of the trays and sheets provides a stronger, more durable connection between outer sheets and inner panel structure than is accomplished with known structural panels. One embodiment of my invention may be regarded as two mutually perpendicular sets of corrugations occupying the same planar space between two outer sheets. This embodiment is more compact than the known multilayer corrugated sheet wherein the corrugations in one layer are perpendicular to corrugations in an adjoining layer. My invention also avoids the delamination problems inherent in the conventional multi-layered construction.

DETAILED DESCRIPTION

Figure 1:
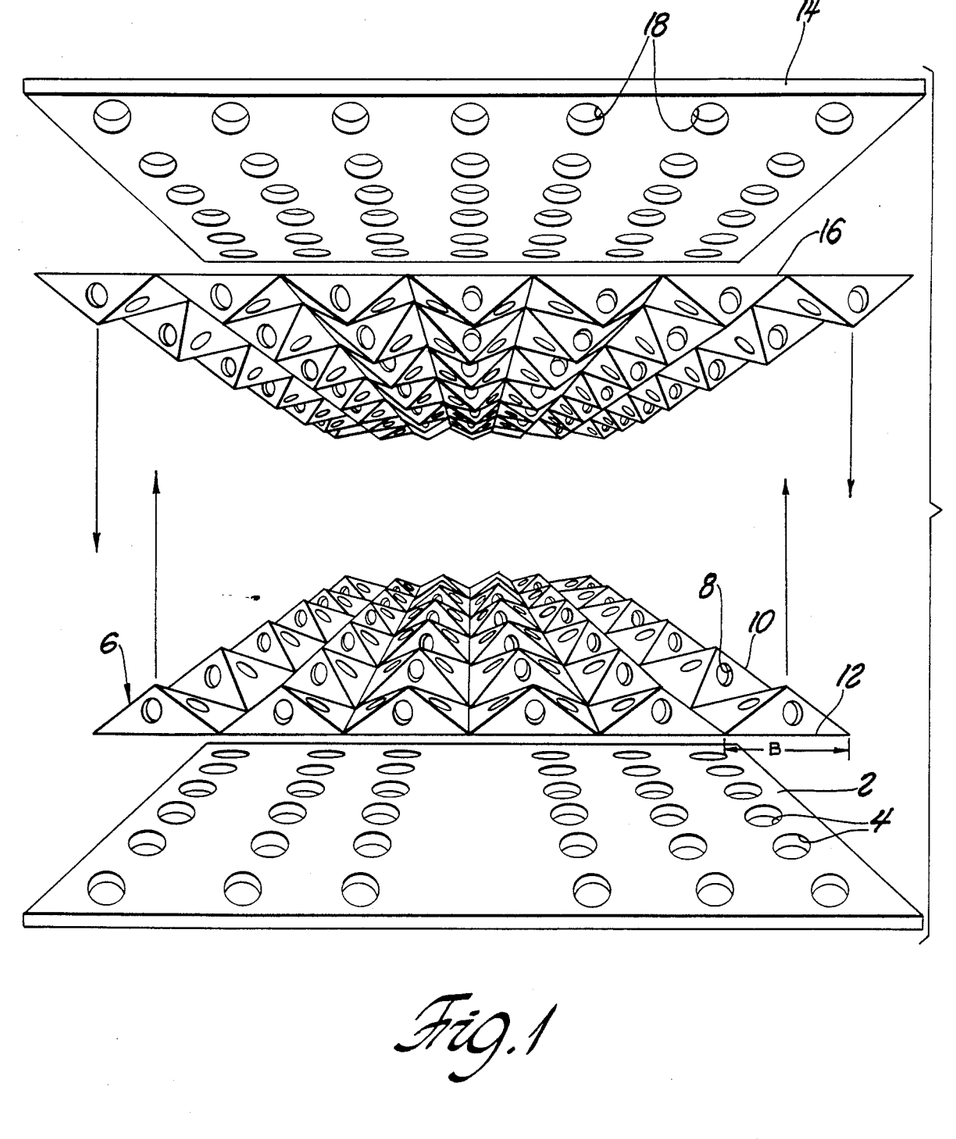
FIG. 1 is an exploded view of a casting pattern used to make an embodiment of my one-piece structural panel by the expendable-pattern casting technique, the panel having inner trays comprised of rows of hollow pyramids.

FIG. 1 is an exploded view of an expendable pattern for casting an embodiment of my structural panel, the various parts of the pattern being formed of expanded polystyrene, wax or other suitable expendable pattern material, the parts joined together by a suitable adhesive. A first plate or sheet 2 defines an array of round, equally spaced apertures 4. Sheet thickness is dictated by desired structural characteristics and minimum thicknesses are determined by casting material flow characteristics. FIG. 1 is one specific example of many possible castings. In this example, the diameter of apertures 4 is between one-fifth and one-half the center-to-center distance separating the holes and sheet 2 is preferably at least 0.1 inches thick, although smaller thicknesses can be used.

In FIG. 1, a first tray 6 defines adjoining rows of hollow four-sided pyramids which are square and open at their bases and which have an aperture 8 in each triangular side 10. The thickness of side 10 is generally the same or slightly smaller than the thickness of sheets 2 while the diameter of apertures 8 is dictated by the amount of material needed on the pyramid edges for strength. In the FIG. 1 example, the diameter of apertures 8 is 20 to 50 percent of the length "B" of the pyramid bases 12. Bases 12 of adjoining pyramids contact with one another so that a V-shaped valley is formed between any pair of pyramids. When tray 6 is fixed to sheet 2, the apex of each pyramid lies on a line extended axially from the centerline of apertures 4. In other words, in this embodiment, the apex of each pyramid will be centered over one of apertures 4.

Figure 5:
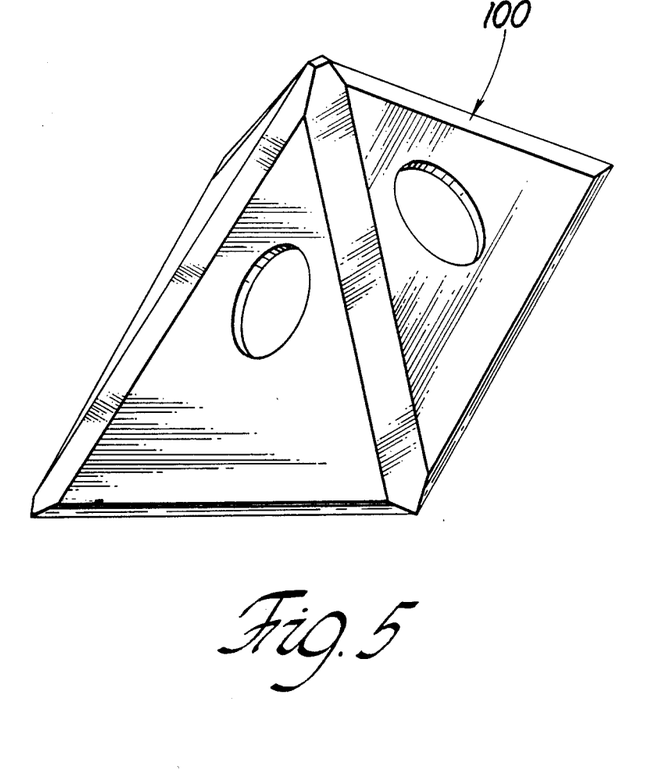
FIG. 5 is a pyramid from one of the trays in FIG. 1, the pyramid modified to have bevelled edges and a slightly truncated apex.

A second sheet 14 is similar to sheet 2, although sheet 14 may optionally be made without apertures. A second tray 16 will be generally similar to tray 6 and will be oriented so that the apexes of its pyramids will point toward intersections of the V-shaped valleys of tray 6. When the pattern is assembled, the pyramids on either tray will matingly fit into the intersections of the other, there being edge-to-edge contact between pyramids of the respective trays. The edges of the pyramids may be bevelled to increase the area of contact between respective sets of pyramids. An example of a bevelled pyramid is seen in FIG. 5 at 100. The apexes of the pyramids and the intersections may be flattened to provide greater surface contact between the tips and the intersections when the pattern is assembled. The mated trays will be sandwiched between plates 2 and 14, with apertures 18 of sheet 14 being centered over the apexes of pyramids on tray 16.

Figure 3:
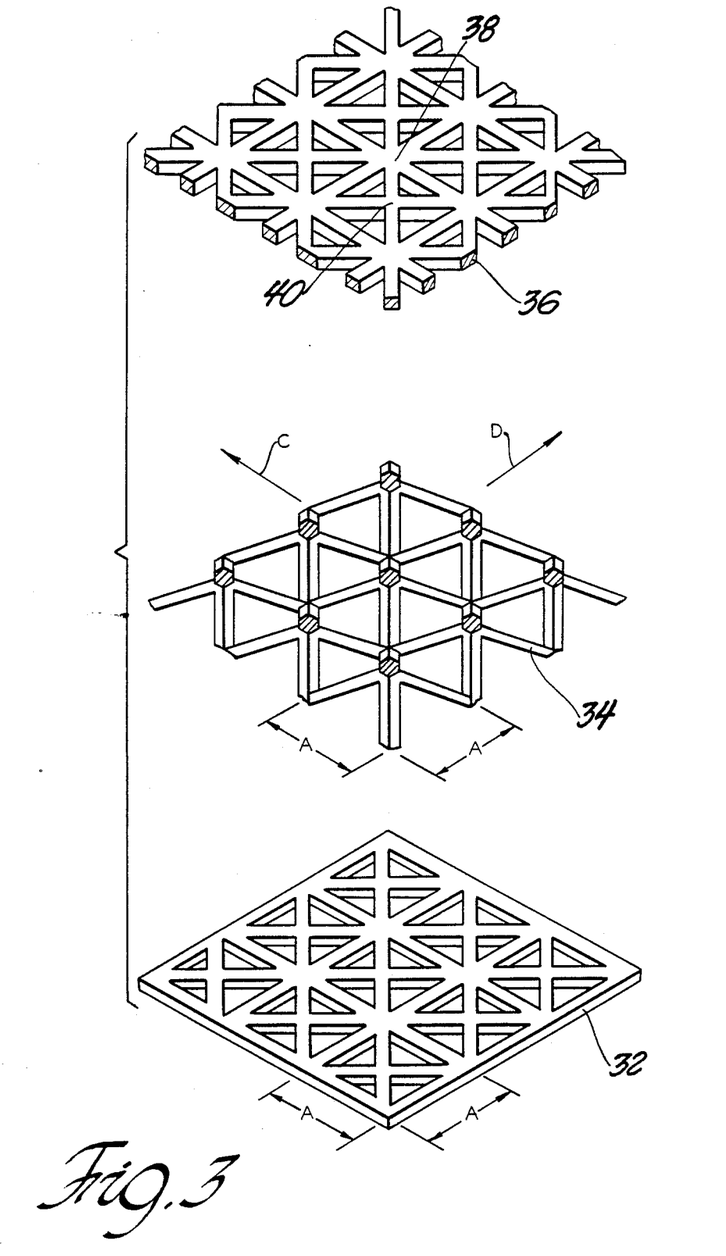
FIG. 3 is another embodiment of my structural panel.
Figure 3A:
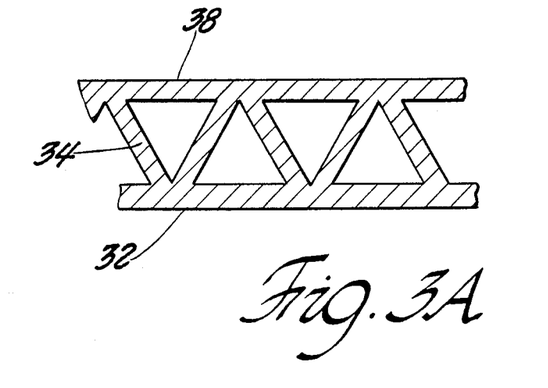
FIG. 3A is a cross-sectional view of an assembly of the FIG. 3 embodiment.

FIG. 3 shows an exploded view of a another embodiment of my structural panel, which is investment cast in the same manner as the first embodiments. The FIG. 3 embodiment of my structural panel is a one piece casting but is shown separated into layers for purposes of illustration. One side of the structural panel is formed by a grid plate 32 which defines a multiplicity of triangular windows. Plate 32 may be regarded as comprising a set of squares having a side dimension "A" and diagonal cross braces connected between opposed corners of each square. Joined integrally to grid plate 32 is a space frame 34 comprised of an array of generally pyramidal structures whose sides define triangular windows when attached to grid plate 32. The pyramidal structures connect with the squares of dimension "A" in grid plate 32. Joined to the apexes of the pyramidal structures is a second grid plate 36, which also defines a multiplicity of triangular windows therethrough. Plate 36 may be regarded as having an array of major nodes, as at 38, where four beams or braces intersect. Between any two major nodes 38 are minor nodes 40 at which only two beams or braces intersect. The major nodes are integrally joined to the apexes of the pyramidal structures of space frame 34. Additionally, if the base is so thin that it is subject to planar instability, a thin member may be inserted between the apex and the base perpendicular to the base. It may be preferred that the sharp corners of the windows of the FIG. 3 embodiment be rounded in order to facilitate the flow of molten metal through the various intersections of beams during the casting process.

FIG. 3 is a very open, skeletized construction for my panel wherein the windows are at or near their maximum size. It is possible to modify the FIG. 3 embodiment to have smaller, round windows similar to those in the embodiments already described. Assuming the FIG. 3 embodiment is modified to have small windows, it may be regarded as having two sets of V-shaped channels formed by space frame 34, one set running parallel to direction "D" and the other set running parallel to direction "C". The channels are solid and continuous except for the small windows, and the one set of channels intersects the other set perpendicularly. The resulting FIG. 3 structure may then be regarded as two sets of mutually perpendicular corrugations occupying the same planar space between two outer sheets.

While the number, shape and size of apertures may be varied, FIG. 3 represents the limit of skeletization which may be approached. FIG. 3 is one specific example of a more general concept.

The more general concept is that of mutually perpendicular corrugations intersecting in a common planar space between two exterior sheets of my structure. The more general concept is perhaps best explained with the aid of FIG. 6, where the exterior walls of the panel are shown at 66 and 68. For conceptual clarity, the "sandwich" material between external walls 66 and 68 is shown as two separate layers 70 and 72 whose corrugations are mutually perpendicular. These layers actually occupy the same, generally planar space so that points 60a, 62a, 64a and 65a are superimposed on respective points 60b, 62b, 64b and 65b. The corrugations of layers 70 and 72 intersect so as to form a tray-like array of two sets of pentahedral chambers generally similar to the pyramid-like structure shown in FIG. 5. The two sets of pentahedral chambers will together define another, tetrahedral set of chambers distributed in an evenly spaced array among the pentahedral chambers. These tetrahedral chambers will be analogous to the tetrahedrally shaped units of core element 44b in FIG. 2.

Figure 6:
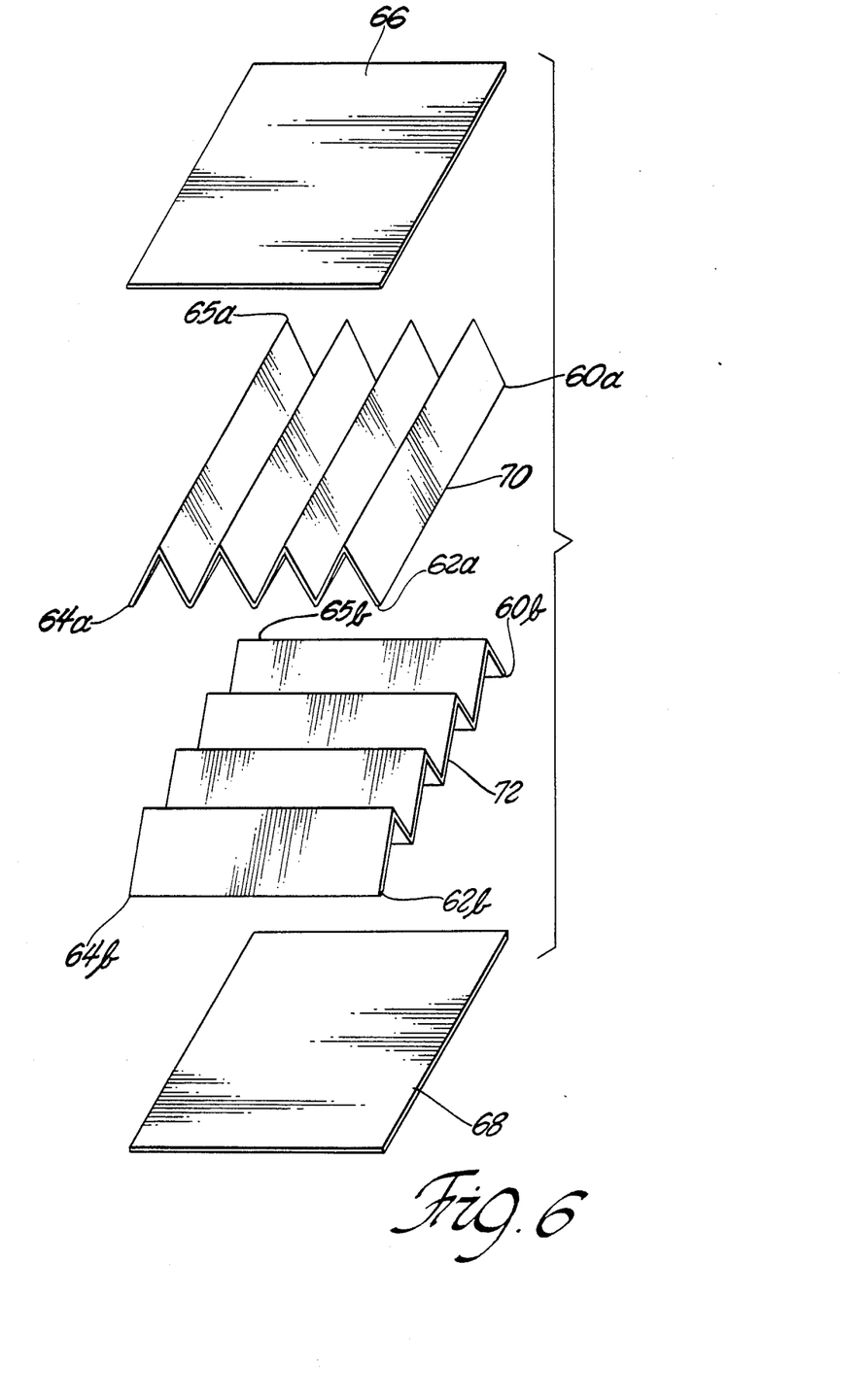
FIG. 6 is an exploded view of a conceptual model of my invention.

Exterior wall 66 will form one side of the first set of pentahedral chambers, which will have one corner terminating at wall 68. Similarly exterior wall 68 will form one side of the second set of tetrahedral structures, which will have one corner terminating at wall 66. The tray-like array can be referred to as a cross-corrugated panel.

Once the pattern for either of the above embodiments has been assembled, casting of the structural panel can be accomplished by an investment technique such as the lost foam casting process. The pattern is given a thin ceramic coating and then buried in dry sand. Molten metal is poured on top of the plastic foam pattern and the heat from the metal causes the foam to evaporate. The ceramic coating keeps the shape and size of the pattern while permitting the gas formed during evaporation of the foam to escape and percolate through the dry sand. The resulting casting will have the same shape as the patterns described previously.

During the lost foam casting process, atoms or molecules from the evaporating plastic foam tend to penetrate the surface of the casting. It may be preferred in some cases to include ingredients in the plastic foam or other pattern material that are desirable for absorption onto the finished casting. For example, niobium may be added to the foam or to the coating on the pattern made from the foam, so that niobium is absorbed, making the surface of the casting tougher. In similar fashion, carbon or nitrogen can be used to harden the surface of the casting. Sufficient carbon for an acceptable level of surface hardening is possibly released from the foam itself during the casting process.

Figure 2:
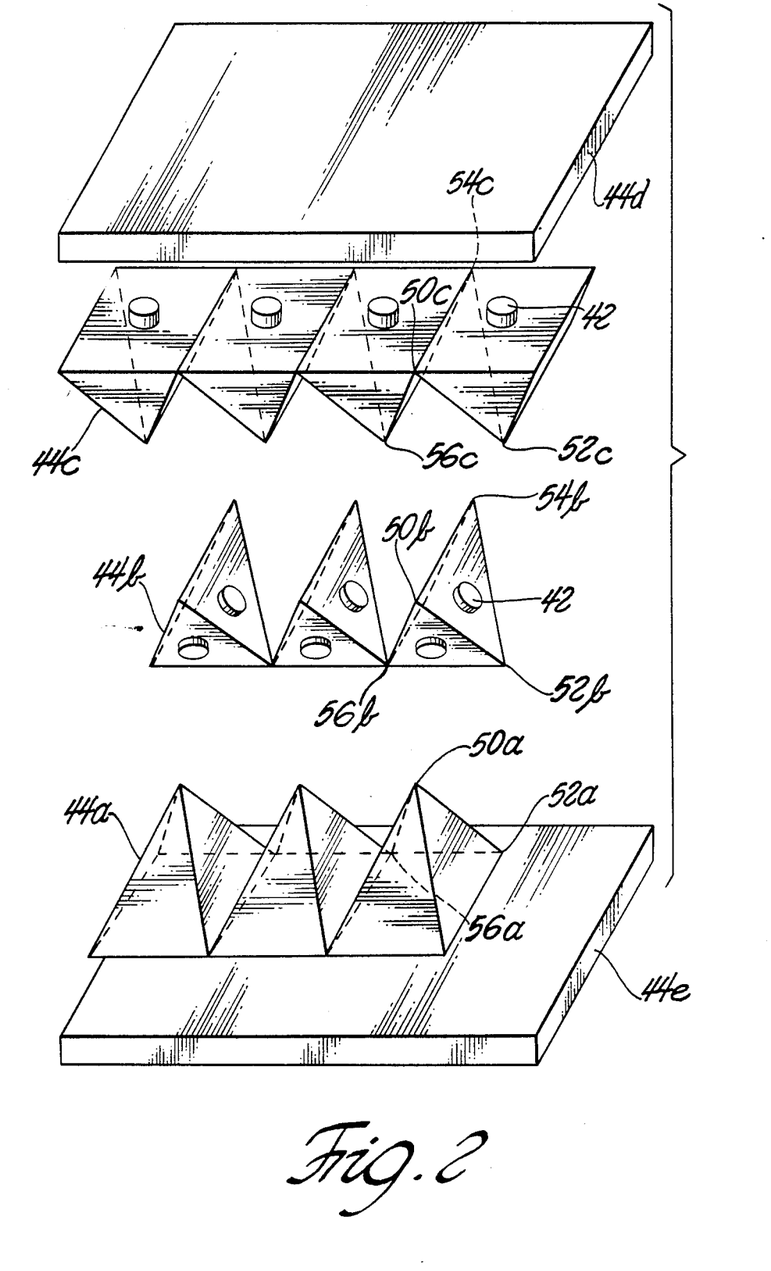
FIG. 2 is a mold used to make an alternate embodiment of my structural panel, which is produced by a retained core or leachable core version of a casting, molding, sintering or similar forming process.

FIG. 2 shows an exploded view of a mold for a panel produced by the retained core process or the leachable core process. In this figure, portions of the outer mold wall are designated at 44d and 44e, with core elements 44a, 44b and 44c disposed between the mold wall portions. Element 44c is a row of adjoining pyramidal structures whose rectangular bases are in a common plane. Each pyramidal base of element 44c has a spacer button 42 attached thereto, the button contacting the upper wall 44d in FIG. 2 when the mold pattern is assembled, so that a planar space is defined between element 44c and upper wall 44d.

The pyramids of element 44a are similar in shape to the pyramidal structures of element 44c, the element 44a pyramids having adjoining rectangular bases spaced from and parallel to the lower wall portion 44e. Buttons (not shown) separate element 44a from lower wall portion 44e so that a planar wall is formed therebetween. Disposed between elements 44a and 44c is core element 44b comprised of a set of tetrahedral units having four surfaces, each face having a button 42 thereon, the surfaces facing away from the viewer being omitted for the sake of simplicity and clarity in the drawing.

When the elements and wall portions of the FIG. 2 mold are stacked together, the triangular surface defined by points 50a, 52a and 56a is in close parallel registry to the triangular surface formed by points 50b, 52b and 56b so that points 50a and 50b are close together, points 52a and 52b are close together, and points 56a and 56b are close together. The triangular surfaces define a narrow gap and are held apart by a button (not shown) similar to one of buttons 42. At the same time, the triangular surface defined by points 54c, 50c and 52c is in close parallel registry with the triangular surface defined by points 54b, 50b, and 52b, so that points 54c and 54b are close together, points 52c and 52b are close together, and points 50c and 50b are close together. Again, the respective triangular surfaces define a narrow gap and are held apart by a button such as that at 42. A number of units similar to that shown in FIG. 2 can be integrally joined together to form a panel of any desired size.

Once the FIG. 2 mold is fixed together, then a suitable metal, homogeneous plastic or fiber reinforced plastic in the fluid state may be introduced in the planar, interstitial spaces defined by walls 44d and 44e, and elements 44a, 44b and 44c. Buttons 42 may be of similar material to the liquid metal or plastic so as to partially melt and/or integrally bond with the metal or plastic and since buttons 42 are used only as locating devices, they may be quite small. When the metal or plastic cools, it forms a solid matrix between walls 44, the matrix having embedded therein the pyramids of elements 44a, 44b and 44c. In the alternative, the mold elements, including the buttons, may be formed as an integral unit which remains intact during the casting process.

Instead of casting a single structural panel as described above, it may be desirable in some instances to cast a structure comprised of such panels all at once.

Figure 4:
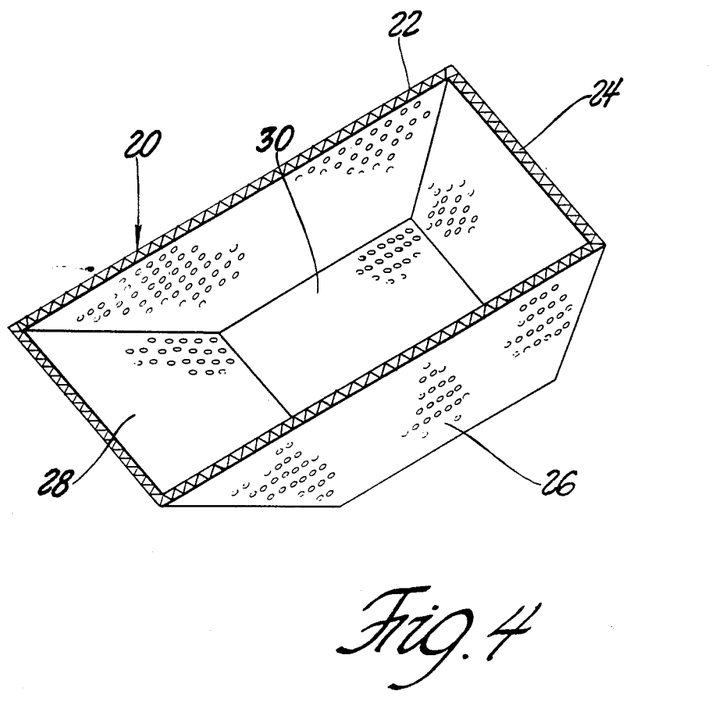
FIG. 4 is a vehicle hull constructed of my structural panels, the vehicle possible being a military tank or other armored vehicle, the intermediate zone of the panel between the outer walls of the panel being shown schematically.

For example, FIG. 4 shows a military vehicle hull fabricated from my structural panels. Individual structural panels may be cast separately, and welded together in much the same way as plate stock is currently. To accomplish this it may be beneficial to cast a solid margin on the panels to facilitate welding. Alternatively, the panels may be cast into a structure of the desired shape. A hull made of this material could be lighter while providing the same strength as a conventional monolithic one.

The patterns for front panel 28, rear panel 24, side panels 22 and 26, and floor panel 30 are fashioned as described above and then bonded together. The various panels are fit together such that the resulting cast hull is a one piece unit having sides, ends and floor intergrally continuous with one another. In similar fashion, a vehicle body substantially closed on the top, bottom, sides and ends could be fashioned as well.

One of the advantages of my structural panel is that the sides 10 of the pyramids are oriented obliquely to the planes in which lie sheets 2 and 14. A bullet or projectile penetrating the panel, will encounter surfaces at various obliquities, thus increasing the possibility of deflection. In addition, the structural panel provides a series of pyramidally and tetrahedrally shaped pockets, which can contain various filler materials to improve the performance of the panel, either structurally or ballistically. When no filler is used, the apertured panels will allow damage to spread only a short distance from the point of origin. Cracks tend to terminate when they encounter an aperture, localizing the damage, and thus preventing global failure. This is of great importance when using the panels for vehicle structures, since a structural failure could cripple the vehicle.

Filler material can form a continuous body, if an apertured panel is used. The continuous filler will be a lattice-like structure interwoven with the structural panel. The pockets can, for example be filled with concrete to improve the stiffness of the panel. Conversely, the structure may be used within a concrete matrix as a reinforcing component, providing a strong open mesh, as a substitute for reinforcing bars.

I wish it to be understood that I do not desire to be limited to the exact details of construction shown and described because obvious modifications will occur to a person skilled in the art, without departing from the spirit and scope of the following claims.

What is claimed is:

1. A cast-as-one-piece structural panel for fabricating hulls and bodies for vehicles, comprising:
   a first plate having an exterior first plate surface and an interior first plate surface, the interior first plate surface disposed completely in a first plane;
   a second plate spaced from the first plate, the second plate having a second plate surface faced toward the first plate;
   a cross corrugated metal panel integrally cast with the first and second metal plates, the cross corrugated panel having an array defining two sets of generally pentahedrally shaped chambers with the plates;
   the first plate forming a single side of each chamber in the first set and the second plate forming a single side of each chamber in the second set;
   the chambers in the first set having walls shared with chambers of the second set;
   the pentahedrally shaped chambers in the first set having one corner terminating at the second metal plate and the pentahedrally shaped chambers in the second set having another corner terminating at the first metal plate.

2. The structural panel of claim 1 wherein the pentahedrally shaped chambers form the boundaries of tetrahedrally shaped chambers distributed in an evenly spaced array among the pentahedral chambers.

3. The structural panel of claim 1 wherein the first plate defines evenly spaced apertures whose diameter is 20 to 50 percent of the center-to-center distance between the apertures.

4. The structural panel of claim 1 wherein the walls define apertures and wherein filler material occupies the chambers and apertures so as to form a single continuous body interwoven with the cross-corrugated panel.

5. The structural panel of claim 1 wherein the walls define apertures having an area no greater than 85 percent of the area of the walls and wherein the wall thickness is no greater than the thickness of a thinner one of the first and second plates.

6. The structural element of claim 1 wherein the second plate has an exterior second plate surface and an interior plate surface, the interior second plate surface being faced toward the interior first plate surface.

7. The structural panel of claim 6 wherein the first plate and the second plate both define a plurality of apertures.

8. The structural panel of claim 6 wherein both the first plate and the second plate are unapertured plates.

9. A cast structural panel comprising:
   a first plate having an exterior first plate surface and an interior first plate surface, the interior first plate surface disposed completely in a first plane;

a second plate having an exterior second plate surface and an interior second plate surface, the interior second plate surface disposed completely in a second plane and faced toward the first interior plated surface;

a first tray integral with the first plate, the first tray comprised of an array of hollow first pyramids joined at their bases to the first plate, the first pyramids contacting one another along their basal edges, the sides of the pyramids defining one or more apertures;

a second tray integal with the second plate, the second tray comprised of an array of hollow second pyramids joined at their bases to the second plate, the second pyramids contacting one another along their basal edges, the sides of the second pyramids defining one or more apertures;

the array of first pyramids and the array of second pyramids meshing together so that edges of the first pyramids contact edges of the second pyramids, the first and second pyramids integrally joined to each other at areas of contact;

the plates and trays together forming a one-piece, continuous casting.

10. The structural panel of claim 9 wherein the apexes of the first pyramids contact points where four bases of the second pyramids join the sides of the second pyramids.

11. The structural panel of claim 10 wherein a continuous filler body forms a lattice-like structure inside the panel and is is interwoven with the trays of the panel, whereby the body and panel are mechanically locked together.

12. The structural panel of claim 11 wherein the diameter of the apertures in the sides of the pyramids are 20 to 50 per cent of the length of the basal edge of the pyramids.

13. The structural panel of claim 12 wherein the thickness of the sides of the pyramids is substantially the same as the thickness of the plates.

14. The structural panel of claim 11 wherein adjoining first pyramids together form V-shaped valleys, the valleys of one set perpendicularly intersecting the valleys of another set, the apexes of the second pyramids fitting closely into the intersections of the V-shaped valleys.

15. The structural panel of claim 9 wherein the first plate is an apertured plate and the second plate is an apertured plate.

16. A one-piece vehicle body portion comprised of a plurality of structural panels integrally formed with one another, each structural panel comprising:

a first plate having an exterior first plate surface and an interior first plate surface, the interior first plate surface disposed completely in a first plane;

a second plate having an exterior second plate surface and an interior second plate surface, the interior second plate surface disposed completely in a second plane and faced toward the first interior plated surface;

a first tray comprised of first pyramids having apertured sides and joined integrally at their bases to the first tray, the first pyramids abutting along their basal edges to form V-shaped valleys between the first pyramids;

a second tray comprised of second pyramids having apertured sides and joined integrally at their bases to the second tray, the second pyramids abutting along their basal edges to form V-shaped valleys between the second pyramids;

the first pyramids and the second pyramids fitting closely together and being integrally joined at the areas of contact;

filler material occupying the pyramids and apertures in the panel so as to form a single continuous body interwoven with the tray.

17. The vehicle body portion of claim 16 wherein the body portion is a frameless one-piece hull for a military tank.

18. The vehicle body portion of claim 13 wherein the vehicle body portion is formed by an investment casting technique.

* * * * *